INVENTOR.
Edgar S. Stoddard

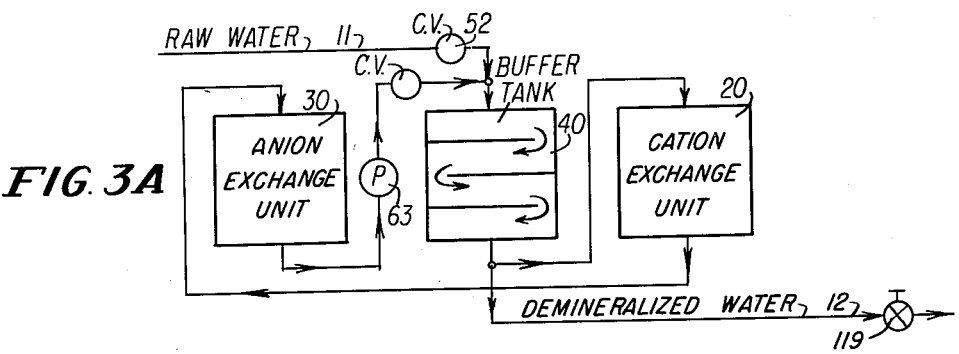
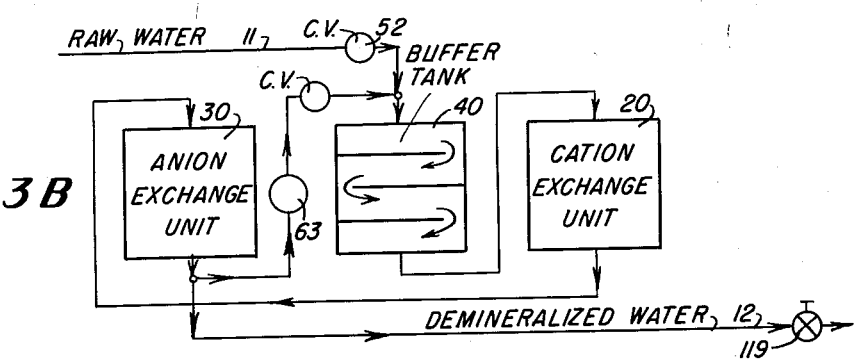
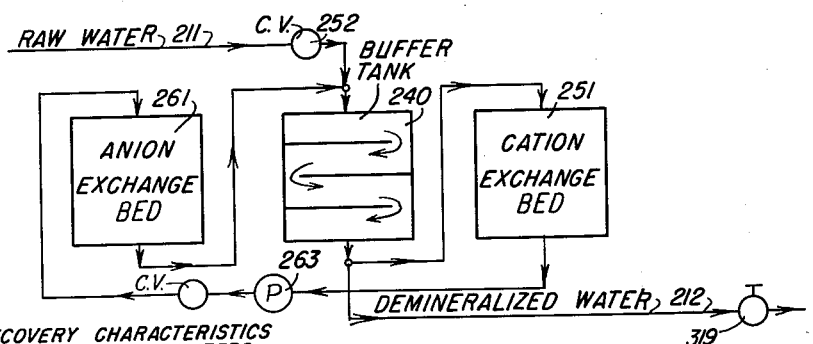
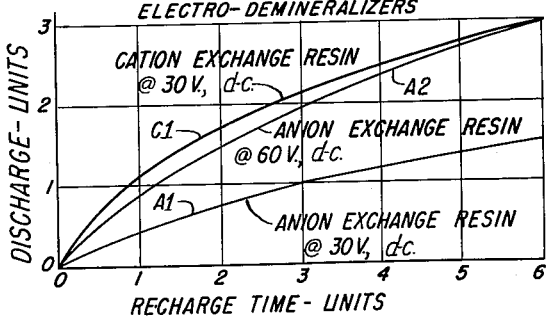

United States Patent Office 2,980,598
Patented Apr. 18, 1961

2,980,598

WATER DEMINERALIZING METHODS AND SYSTEMS

Edgar S. Stoddard, Oak Park, Ill., assignor to General Electric Company, a corporation of New York Filed Dec. 9, 1957, Ser. No. 701,465

6 Claims. (Cl. 204—151)

The present invention relates to water demineralizing methods and systems, and particularly to such methods and systems employing separate and independent cation exchange units and anion exchange units, each involving both ion exchange and electrodialysis.

It is a general object of the invention to provide an improved method and system of the character noted, employing an electro-cation-exchange unit and an electro-anion-exchange unit, and an arrangement for substantially matching the regenerating rates of the two units, so that following a draw-off of demineralized water from the system, substantially equal recovery or regeneration of the two units takes place during a given recovery time interval.

Another object of the invention is to provide in a method and system of the character noted, an improved circulating system involving a buffer tank so as to prevent substantial degeneration of the cation exchange unit and the anion exchange unit incorporated in the system incident to a draw-off of demineralized water therefrom, so that the recovery time interval of the two units is reduced to a substantial minimum.

A further object of the invention is to provide in a method and system of the character noted, an improved power supply arrangement for the electro-cation-exchange unit and the electro-anion-exchange unit incorporated therein, whereby the electrical conditions may be selectively varied in a ready manner so as selectively to establish the desired regenerating rates of the two units.

A further object of the invention is to provide an improved and compact arrangement of an electro-cation-exchange unit and an electro-anion-exchange unit.

A further object of the invention is to provide in a method and system of the character noted, an improved arrangement of the two units so that both the rates of degeneration thereof are substantially matched and so that the rates of regeneration thereof are substantially matched, with the result that the regeneration states of the two units are always substantially equal in order to avoid relatively low pH water or relatively high pH water in the demineralized water outlet.

A still further object of the invention is to provide in a method and system of the character noted, an improved arrangement of the two ion exchange units, wherein they have substantially equal total ion exchange capacities in total grains of dissolved solids that may be extracted from raw water between regenerations of the units.

Further features of the invention pertain to the particular arrangement of the steps of the method and of the elements of the system, whereby the above-outlined and additional operating features thereof are attained.

The invention, both as to its organization and method of operation, together with further objects and advantages thereof, will best be understood by reference to the following specification taken in connection with the accompanying drawings, in which:

Fig. 3A is a schematic diagram of a water circulating system interconnecting the electro-cation-exchange unit and the electro-anion-exchange unit of the system of Fig. 1;

Fig. 3B is a schematic diagram of a modified water circulating system interconnecting the electro-cation-exchange unit and the electro-anion-exchange unit of the system of Fig. 1;

Fig. 4 is a schematic diagram of a water circulating system interconnecting the electro-cation-exchange unit and the electro-anion-exchange unit of the system of Fig. 2; and Fig. 5 is a graphic illustration of the recovery characteristics of an electro-cation-exchange unit and an electro-anion-exchange unit of the types incorporated in the systems of Figs. 1 and 2.

Figure 1:
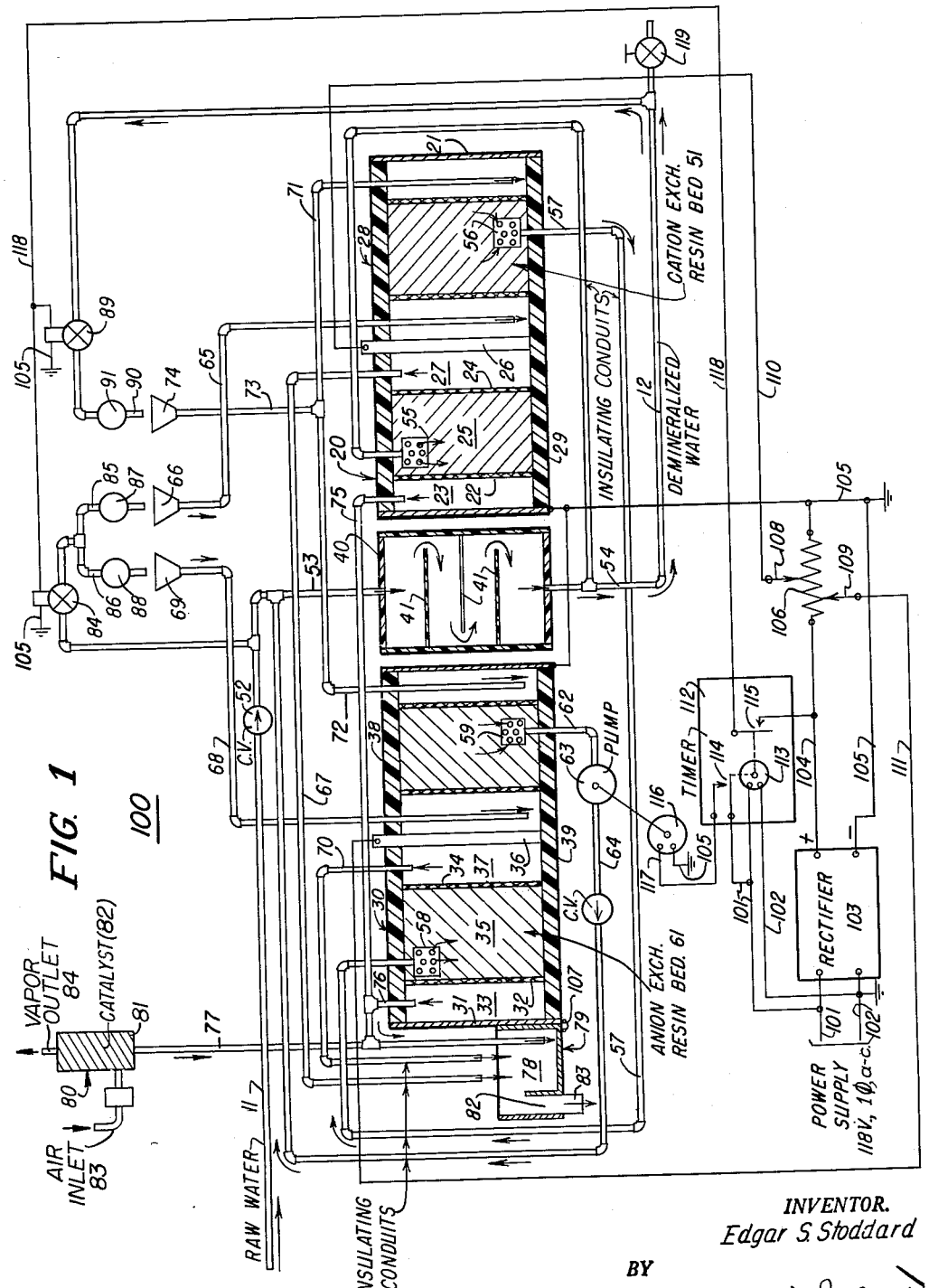
Figure 1 is a diagrammatic illustration of a water demineralizing system embodying the present invention, and in which the method of the present invention is carried out.

At the outset, it is noted that the present invention is predicated upon the discovery that the performance characteristics of a water demineralizing system employing electro-demineralizing apparatus involving both ion exchange and electrodialysis can be drastically improved by providing an electro-cation-exchange unit and a separate and independent electro-anion-exchange unit, wherein the power supply systems for the two units are also separate and independent of each other, so that the recovery or regenerating rates of the two units can be selectively varied to obtain a substantial match therebetween. This improved method and system takes advantage of the peculiar recovery characteristics of the cation exchange bed and the anion exchange bed respectively incorporated in the cation exchange unit and in the anion exchange unit of the system. More particularly, in two comparable such resin beds having approximately the same ion exchange capacities and at substantially the same state of generation, it will be observed that the cation exchange resin bed has a relatively low specific resistance and the anion exchange resin bed has a relatively high specific resistance, the ratio between the two specific resistances mentioned being about 1:2. Accordingly, following a unit degeneration of the two resin beds, and with the same direct voltage applied between the anode and the cathode in each of the units, the regenerating current of the cation exchange bed is about three times that of the anion exchange bed, whereby to pass the required coulombs to effect substantially equal regenerations of the two resin beds, approximately one unit of time is required for the cation exchange bed and approximately three units of time are required for the anion exchange bed. Moreover, these time intervals become further disproportional in the event of the degeneration of the units in excess of one unit, due to the normal contours of the recovery curves of the units; whereby the state of generation of the cation resin bed frequently becomes substantially higher than that of the anion exchange bed, in the event of an excess draw-off of demineralized water from the system, with the result that in the latter draw-off "acid water" is obtained, as the cation exchange resin bed is far more effective than the anion exchange resin bed.

Now it has been discovered that the time interval required to effect the complete regeneration of the cation exchange bed may be substantially matched to the time interval required to effect the complete regeneration of the anion exchange bed by applying a substantially lower direct voltage between the anode and the cathode in the cation exchange unit than is applied between the anode and the cathode in the anion exchange unit.

In an illustrative embodiment of the system, the two recovery or regenerating rates can be substantially matched by the application of a direct voltage of about 30 volts between the anode and the cathode in the cation exchange unit and by the application of a direct voltage of about 60 volts between the anode and the cathode in the anion exchange unit. Hence, in accordance with the method and system of the present invention, the regeneration rates of the two beds in the two units substantially matched each other at all times so that the station of generation thereof substantially matched each other at all times, so as to avoid both low pH water and high pH water in the outlet of the demineralizing system.

Referring now to Fig. 1 of the drawings, the demineralizing system 100 there illustrated, and embodying the features of the present invention and in which the method of the present invention is carried out, is especially designed for home use, and essentially comprises a raw water supply pipe 11, a demineralized or treated water supply pipe 12, an electro-cation-exchange unit 20, an electro-anion-exchange unit 30, and a buffer tank 40. The raw water in the raw water supply pipe 11 is under gauge pressure and is connected to the city water main, not shown; while the demineralized water supply pipe 12 is normally connected to the water heater, not shown, in the home. The raw water in the supply pipe 11 contains substantial dissolved mineral salts supplying thereto such cations as: $Ca^{++}$, $Mg^{++}$, $Fe^{++}$, $Na^+$, $K^+$, etc., and such anions as: $HCO_3^-$, $SO_4^{--}$, $Cl^-$, $CO_3^{--}$, etc. Moreover, this raw water may be quite hard and may have a total dissolved solids content as high as about 70 grains/gallon (1200 p.p.m.), the La Grange Park, Illinois well water employed in certain tests discussed hereinafter having a total dissolved solids content of 64 grains/gallon (1090 p.p.m.). In the operation of the units 20 and 30, the raw water is demineralized, whereby the demineralized or treated water delivered to the supply pipe 12 has a total dissolved solids content not in excess of 3 grains/gallon (51 p.p.m.).

Fundamentally, the unit 20 comprises a tubular outer shell 21 constituting a cathode, a tubular permeable diaphragm 22 arranged concentrically within the cathode 21 and cooperating therewith to define an annular catholyte chamber 23 therebetween, a tubular permeable diaphragm 24 arranged concentrically within the diaphragm 22 and cooperating therewith to define an annular treatment chamber 25 therebetween, and a substantially rod-like anode 26 arranged concentrically within the diaphragm 24 and cooperating therewith to define an annular anolyte chamber 27 therebetween. The elements 21, 22, 24 and 26 are arranged in an upstanding position and the upper and lower ends of the chambers 23, 25 and 27 are respectively closed by lower and upper insulating headers 28 and 29. The cathode 21 may be formed of steel; the diaphragms 22 and 24 may be formed of suitable fibrous or ceramic material; the anode 26 may be formed of carbon, etc.; and the headers 28 and 29 may be formed of a suitable synthetic organic resin.

The construction of the unit 30 is identical to that of the unit 20 described above; whereby the unit 30 comprises the corresponding elements 31 to 39, inclusive.

The unit 20 comprises a porous cation exchange bed 51 of substantially annular form arranged in the treatment chamber 25 and substantially completely filling the same; and the unit 30 comprises a porous anion exchange bed 61 of substantially annular form arranged in the treatment chamber 35 and substantially completely filling the same. The cation exchange bed 51 accommodates the ready passage therethrough of the water undergoing treatment and essentially comprises a loosely packed mass of cation exchange material (preferably a synthetic organic polymeric cation exchange resin); and the anion exchange bed 61 accommodates the ready passage therethrough of the water undergoing treatment and essentially comprises a loosely packed mass of anion exchange material (preferably a synthetic organic polymeric anion exchange resin). The two beds 51 and 61 are so related that they have substantially equal cation and anion exchange capacities in total grains of dissolved solids that may be removed from the water undergoing treatment. The buffer tank 40 may be formed of insulating material, such, for example, as a suitable synthetic organic resin; and a number of baffles 41 are arranged internally thereof to define a sinuous passage from the upper inlet thereof to the lower outlet thereof.

More particularly, this cation exchange resin is of bead-like formation and may comprise the strong-acid resin sold by Rhom and Haas under the name "Amberlite IR-120"; and this anion exchange resin is of bead-like formation and may comprise the strong-base resin sold by Rhom and Haas under the names "Amberlite IRA-400" and "Amberlite IRA-410." A cation exchange resin of the type specified essentially comprises a stable insoluble synthetic organic polymer, active acidic functional groups chemically bonded thereto and dissociable into free mobile cations to impart a negative charge to the polymer, and water in gel relationship with the polymer. Similarly, an anion exchange resin of the type specified essentially comprises a stable insoluble synthetic organic polymer, active basic functional groups chemically bonded thereto and dissociable into free mobile anions to impart a positive charge to the polymer, and water in gel relationship with the polymer. The active acidic functional groups attached to the associated organic polymer are oriented with respect to the interfaces thereof so as to be partially or completely dissociable in the internal gel water into fixed negative ions linked to the polymer and into mobile exchangeable positive ions; and similarly, the active basic functional groups attached to the associated organic polymer are oriented with respect to the interfaces thereof so as to be partially or completely dissociable in the internal gel water into fixed positive ions linked to the polymer and into mobile exchangeable negative ions.

Typical such polymers to which active acidic functional groups may be attached include: phenol-aldehyde resins, polystyrene-divinylbenzene copolymers, and the like; and such suitable active acidic functional groups include: $-SO_3H$, $-COOH$, and the like; $-SO_3H$ being usually preferred because of its high dissociation constant. Typical such polymers to which active basic functional groups may be attached include: urea-formaldehyde resins, melamineformaldehyde resins, polyalkylene-polyamine-formaldehyde resins, and the like; and such suitable active basic functional groups include: quaternary ammonium hydroxides, amino groups, the guanidyl group, the dicyanodiamidine group, and the like organic nitrogen-containing basic groups; the quaternary ammonium hydroxide groups, the guanidine and dicyanodiamidine residue being usually preferred because of their high dissociation constants. Normally the water in gel relationship with the polymer should be present in an amount of at least 15% of the weight of the dry resin.

The raw water supply pipe 11 is connected by a check valve 52 to a conduit 53 that communicates with the upper inlet of the buffer tank 40; and the demineralized water supply pipe 12 is connected to a conduit 54 that communicates with the lower outlet of the buffer tank 40. Further, the conduit 54 communicates with a fixture 55 arranged in the upper portion of the treatment chamber 25; and a fixture 56 arranged in the lower portion of the treatment chamber 25 communicates with a conduit 57; while the conduit 57 further communicates with a fixture 58 arranged in the upper portion of the treatment chamber 35; while a fixture 59 arranged in the lower portion of the treatment chamber 35 communicates with a conduit 62. A pump 63 is provided, the inlet of which communicates with the conduit 62 and the outlet of which communicates with a conduit 64; which conduit 64 is also connected to the conduit 53. Accordingly, it will be understood that the raw water to be demineralized is supplied from the supply pipe 11 via the check valve 52 and the conduit 53 into the upper portion of the buffer tank 40. The water is circulated through the buffer tank 40 in a sinuous path effected by the baffles 41 into the conduit 54 and thence flows via the fixture 55 into the upper portion of the treatment chamber 25 and through the porous resin bed 51 therein, into the fixture 56 and thence into the conduit 57. The water further flows from the conduit 57 through the fixture 58 into the upper portion of the treatment chamber 35 and through the porous resin bed 61 therein into the fixture 59 and thence into the conduit 62. From the conduit 62, the water is pumped by the pump 63 and through the conduit 64 back into the conduit 53 for recirculation through the buffer tank 40. In the circulation of the water, it is demineralized; whereby the demineralized water is supplied from the buffer tank 40 via the conduit 54 into the supply pipe 12.

The lower portion of the anolyte chamber 27 communicates with an upstanding conduit 65 extending to the exterior and provided with a funnel 66 for the delivery of anolyte into the anolyte chamber 27; while the upper portion of the anolyte chamber 27 communicates with an upstanding conduit 67 extending to the exterior. Similarly, the lower portion of the anolyte chamber 37 communicates with an upstanding conduit 68 extending to the exterior and provided with a funnel 69 for the delivery of anolyte into the anolyte chamber 37; while the upper portion of the anolyte chamber 37 communicates with an upstanding conduit 70 extending to the exterior. The lower portion of the catholyte chamber 23 communicates with an upstanding conduit 71 extending to the exterior; and the lower portion of the catholyte chamber 33 communicates with an upstanding conduit 72 extending to the exterior; the conduits 71 and 72 being joined to a conduit 73 that is provided with a funnel 74 for the delivery of catholyte into the catholyte chambers 23 and 33. The upper portion of the catholyte chamber 23 communicates with an upstanding conduit 75 extending to the exterior; and similarly, the upper portion of the catholyte chamber 33 communicates with an upstanding conduit 76 extending to the exterior; which conduits 75 and 76 are joined to a conduit 77; the lower end of the conduit 77 communicates with a mixing chamber 78 provided in a mixing tank 79; while the upper end of the conduit 77 communicates either with the atmosphere, or with a conventional catalytic unit 80, as illustrated. This arrangement of the conventional unit 80 forms no part of the present invention, and (if provided) it ordinarily comprises a container 81 in which there is arranged a body of catalytic material 82 that is employed for the purpose of inducing a controlled water-producing reaction involving hydrogen gas that is contained in the catholyte discharge from the catholyte chambers 23 and 33. The catalyst 82 may essentially comprise platinum beds that are commonly employed for the purpose mentioned, and air is admitted into the container 81 via an associated air inlet and filter plug 83 to supply the required oxygen, and a vapor outlet 84. While the provision of the conventional unit 80 forms no part of the present invention, as previously noted, the use thereof is recommended, since it minimizes the usual hydrogen explosion hazard that is inherent in the operation of electrolytic cells. Also the outer ends of the conduits 67 and 70 are disposed above and communicate with the mixing chamber 78; whereby the anolyte from the anolyte chambers 27 and 37 and the catholyte from the catholyte chambers 23 and 33 are mixed in the mixing chamber 78 of the mixing tank 79, and then the mixture spills over into a drain chamber 82 provided therein and connected to an associated drain conduit 83.

The conduit 53 also extends upwardly above the funnels 66 and 69 and is provided with a solenoid controlled valve 84 that normally occupies its closed position and communicates with two conduits 85 and 86 respectively positioned above the funnels 66 and 69. Also, the conduits 85 and 86 respectively contain flow controllers 87 and 88 for establishing the streams of anolyte into the respective funnels 66 and 69, when the valve 84 occupies its open position. Further, the supply pipe 12 extends upwardly above the funnel 74 and contains a solenoid controlled valve 89 that normally occupies its closed position and communicates with a conduit 90 disposed above the funnel 74, the conduit 90 also including a flow controller 91 for the purpose of establishing the flow of catholyte through the conduit 90 into the funnel 74 when the valve 89 occupies its open position.

Further, the system 100 comprises a source of electric power of 118 volts, A.-C., single-phase, including two conductors 101 and 102 respectively connected to the input terminals of an associated rectifier 103, the conductor 102 being connected to ground potential; and the output terminals of the rectifier 103 being connected to two conductors 104 and 105 that are bridged together by an associated resistor 106, the conductor 105 being connected to ground potential. Also, the conductor 105 is connected to the cathodes 21 and 31; and the mixing tank 79 is grounded out by a strap 107 connected to the cathode 31. Two adjustable wipers 108 and 109 are operatively associated with the resistor 106 and respectively connected to two conductors 110 and 111 that are respectively connected to the anode 26 and to the anode 36. Accordingly, the resistor 106 constitutes a bridge circuit supplying voltages to the adjustable wipers 108 and 109 respectively connected to the anodes 26 and 36; and in passing, it is mentioned that the voltage applied to the wiper 108 is normally lower than that supplied to the wiper 109 so that a relatively low voltage is applied to the anode 26 and a relatively high voltage is applied to the anode 36.

The system 100 further comprises a timer 112 that includes a timer motor 113 of the synchronous type and bridged across the supply conductors 101 and 102. Preferably the timer motor 113 is of the "Telechron" type and controls a pair of switches 114 and 115. The pump 63 is provided with an electric drive motor 116 and the terminals thereof are connected between the ground conductor 105 and a conductor 117. The switch 114 respectively terminates the line conductor 101 and the conductor 117; while the switch 115 respectively terminates the conductor 104 and a conductor 118. The solenoids of the valves 84 and 89 are connected in parallel relation between the ground conductor 105 and the conductor 118.

In view of the foregoing, it will be understood that in the operation of the system 100, the timer motor 113 periodically closes and later opens the switch 114, whereby the electric drive motor 116 is correspondingly periodically operated to effect corresponding operation of the pump 63, with the result that the water undergoing treatment is circulated from the treatment chamber 35 of the unit 30 and through the buffer chamber 40 and thence through the treatment chamber 25 of the unit 20 and thus back to the treatment chamber 35 of the unit 30; whereby the circulated water is demineralized as previously noted. Also, in the operation of the system 100, the timer motor 113 periodically closes and later opens the switch 115, whereby the solenoids of the valves 84 and 85 are correspondingly energized and later deenergized periodically. When the solenoid of the valve 84 is thus energized, the valve 84 is operated from its closed position into its open position so as to supply water as fresh anolyte from the conduit 53 via the conduits 85 and 86 into the funnels 66 and 69 and thus into the anolyte compartments 27 and 37 of the respective units 20 and 30. When fresh anolyte is supplied to the anolyte chamber 27, the anolyte therein is displaced therefrom and flows via the conduit 67 into the mixing chamber 78 of the mixing tank 79; and likewise, when fresh anolyte is supplied to the anolyte chamber 37, the anolyte therein is displaced therefrom and flows via the conduit 70 into the mixing chamber 78 of the mixing tank 79. When the solenoid of the valve 89 is thus energized, the valve 89 is operated from its closed position into its open position so as to supply water as fresh catholyte from the supply pipe 12 via the conduit 90 into the funnel 74 and thence via the conduits 71 and 72 into the respective catholyte chambers 23 and 33 of the units 20 and 30. When fresh catholyte is thus supplied into the catholyte chamber 23, the catholyte therein is displaced therefrom and flows via the conduits 75 and 77 into the mixing chamber 78 of the mixing tank 79; and likewise, when fresh catholyte is thus supplied into the catholyte chamber 33, the catholyte therein is displaced therefrom and flows via the conduits 76 and 77 into the mixing chamber 78 of the mixing tank 79. In the mixing chamber 78 of the mixing tank 79, the anolyte and the catholyte are mixed and overflow into the drain chamber 82 and thence via the drain conduit 83 to the exterior.

A valve 119 is arranged in the supply pipe 12; and when the valve 119 is opened, the demineralized water flows therefrom, while raw water from the supply pipe 11 is supplied into the buffer tank 40 and forces the previously demineralized water therefrom into the supply pipe 12. In the arrangement, when demineralized water is drawn off from the buffer tank 40, raw water is supplied to the buffer tank 40 and mixes with the previously demineralized water therein so that a substantial dilution of the raw water takes place; and thereafter, the mixed water is pumped in the local loop circuit from the buffer tank 40 through the ion exchange beds 51 and 61 and back to the buffer tank 40 so as to effect demineralization of the mixed water and the corresponding degeneration of the ion exchange beds 51 and 61. After the draw-off from the system, and as time proceeds, the beds 51 and 61 are regenerated by virtue of the application of the potentials between the anodes 26 and 36 and the respective cathodes 21 and 31. Specifically, the bed 51 is regenerated with the exchange of the sorbed cations of the mineral salts for hydrogen ions and with the migration of the cations of the mineral salts through the diaphragm 22 into the catholyte contained in the catholyte chamber 23. Also there is some migration of the anions of the mineral salts from the water in the treatment chamber 25 through the diaphragm 24 into the anolyte contained in the anolyte chamber 27. The cations and the anions are subsequently flushed along with the catholyte and anolyte from the respective chambers 23 and 27 and are ultimately carried into the drain conduit 83. Specifically, the bed 61 is regenerated with the exchange of the sorbed anions of the mineral salts for hydroxyl ions and with the migration of the anions of the mineral salts through the diaphragm 34 into the anolyte contained in the anolyte chamber 37. Also, there is some migration of the cations of the mineral salts from the water in the treatment chamber 35 through the diaphragm 32 into the catholyte contained in the catholyte chamber 33. The anions and the cations are subsequently flushed along with the anolyte and the catholyte from the respective chambers 37 and 33 and ultimately carried into the drain conduit 83.

In the system 100, the conduits 57 and 64, or at least appropriate sections thereof, are formed of insulating material in order to minimize stray electric currents therebetween by virtue of the fact that the anolyte in the anolyte chamber 27 is at a voltage with respect to ground potential that is essentially different and lower than that of the anolyte in the anolyte chamber 37.

In a constructional example of the electro-demineralizing unit 20: the internal diameter of the diaphragm 24 may be about 8½"; the internal diameter of the diaphragm 22 may be about 17"; the internal diameter of the cathode 21 may be about 20"; the height of the treatment chamber 25 between the headers 28 and 29 may be about 12¼"; and the thickness of the treatment chamber 25 between the diaphragms 22 and 24 may be about 4". Accordingly, the volume of the treatment chamber 25 is about 1 cubic foot, and the cation exchange resin bed 51 involves a corresponding volume of 1 cubic foot of the resin "Amberlite IR-120." The fundamental construction of the unit 30 may be identical to that of the unit 20; whereby the anion exchange resin bed 61 involves a corresponding volume of 1 cubic foot of the resin "Amberlite IRA-410." Moreover, in the system 100, the water pressure in the treatment chambers 25 and 35 of the respective units 20 and 30 should not be in excess of 45 p.s.i.

When the units 20 and 30 are fully regenerated and a draw-off of demineralized water from the supply pipe 12 is effected, the beds 51 and 61 are degenerated by substantially equal amounts, whereby it is desirable that the rates of recovery or regeneration of the beds 51 and 61 should be equal in the time interval immediately following the draw-off of demineralized water from the pipe 12; and this can be accomplished by matching the regeneration or recovery rates of the beds 51 and 61 by the application of the required potentials to the anodes 26 and 36. Specifically, in order to achieve this objective, the voltage applied to the anode 26 is substantially lower than the voltage applied to the anode 36, and in the illustrated embodiment of the system 100, the respective voltages may be 30 volts and 60 volts. This will be better understood from an examination of the performance curves of Fig. 5, wherein the curves A1 and A2 represent the recovery characteristics of the anion exchange resin bed 61 at the respective voltages of 30 and 60 volts D.-C., and the curve C1 represents the recovery characteristic of the cation exchange resin bed 51 at the voltage of 30 volts D.-C. More particularly, as illustrated by the curve A1, following a degeneration or discharge of the resin bed 61 corresponding to one-half unit of degeneration, a time interval of one unit of time may be required in order again to return the resin bed 61 to a state of full regeneration at a voltage of 30 volts D.-C. applied between the anode 36 and the cathode 31, and following a degeneration or discharge of the resin bed 61 corresponding to one unit of degeneration, a time interval of three units of time may be required in order again to return the resin bed 61 to a state of full regeneration at the voltage of 30 volts D.-C. On the other hand, as illustrated by the curve C1, following a degeneration or discharge of the resin bed 51 corresponding to one unit of degeneration, a time interval of somewhat less than one unit of time may be required in order again to return the resin bed 51 to a state of full regeneration at a voltage of 30 volts D.-C. applied between the anode 26 and the cathode 21, and following a degeneration or discharge of the resin bed 51 corresponding to two units of degeneration, a time interval of somewhat less than three units of time may be required in order again to return the resin bed 51 to a state of full regeneration at the voltage of 30 volts D.-C. Accordingly, it will be understood that when the resin beds 51 and 61 are substantially equally degenerated, the recovery time intervals thereof at the same anode voltage are vastly different, the recovery time interval of the anion exchange bed 61 being substantially greater than that of the cation exchange bed 51. This is due at least in part, to the fact that in all equivalent states of generation, and with the same geometry, the internal resistance of the resin bed 61 is essentially higher than that of the resin bed 51.

Now, however, the recovery characteristic of each of the beds 51 and 61 is responsive to the anode-cathode voltage applied thereacross, whereby the recovery characteristic curve A2 of the anion exchange resin bed 61 may be made substantially or closely to match the recovery characteristic curve C1 of the cation exchange resin bed 51, by the application of a voltage between the anode 36 and the cathode 31 of 60 volts D.-C. Accordingly, in the present example, by applying the relatively low voltage of about 30 volts to the anode 26 of the unit 20 and the relatively high voltage of about 60 volts to the anode 36 of the unit 30, the recovery characteristics of the two resin beds 51 and 61 represented by the curves C1 and A2 may be substantially or closely matched.

When there is a draw-off of demineralized water from the supply pipe 12, the resin beds 51 and 61 are substantially equally degenerated; and in the time interval following the draw-off, the regenerations of the resin beds 51 and 61 are substantially equal, whereby at any time the state of charge or regeneration of the two resin beds 51 and 61 are substantially matched. This arrangement is very advantageous in view of the fact that it prevents low pH water or high pH water in the buffer tank 40 and consequently in the supply pipe 12.

In the operation of the system 100, the total power requirements from the rectifier 103 to be supplied to the units 20 and 30 respectively at 30 volts D.-C. and at 60 volts D.-C., as explained above, may be in the general range 2–4 watts; and in the operation of the system 100, the raw water in the raw water supply pipe 11 may have a total dissolved solids content of 64 grains/gallon (the La Grange, Illinois, well water previously mentioned), while the demineralized water in the demineralized water supply pipe 12 has a total dissolved solids content not higher than 3 grains/gallon; and the system 100 has a capacity for demineralizing raw water of the character noted above of at least about 25 to 30 gallons/24 hours, which is adequate for the home use noted.

Referring now to Fig. 3A, there is illustrated schematically the water circulating arrangement incorporated in the system 100 of Fig. 1. In the arrangement: it will be observed that the pump 63 is located in the connection between the lower outlet of the anion exchange unit 30 and the upper inlet of the buffer tank 40; the raw water supply pipe 11 communicates with the upper inlet of the buffer tank 40; and the demineralized water supply pipe 12 communicates with the lower outlet of the buffer tank 40. In Fig. 3B, a modified form of the water circulating arrangement for the system 100 of Fig. 1 is provided that differs from that of Fig. 3A only by the transfer of the connection of the demineralized water supply pipe 12 from the lower outlet of the buffer tank 40 to the lower outlet of the anion exchange unit 30. The arrangement of Fig. 3B is somewhat more advantageous than that of Fig. 3A, in that the raw water admitted from the raw water pipe 11 into the buffer tank 40 must traverse both of the units 20 and 30 before it can proceed into the demineralized water supply pipe 12.

Figure 2:
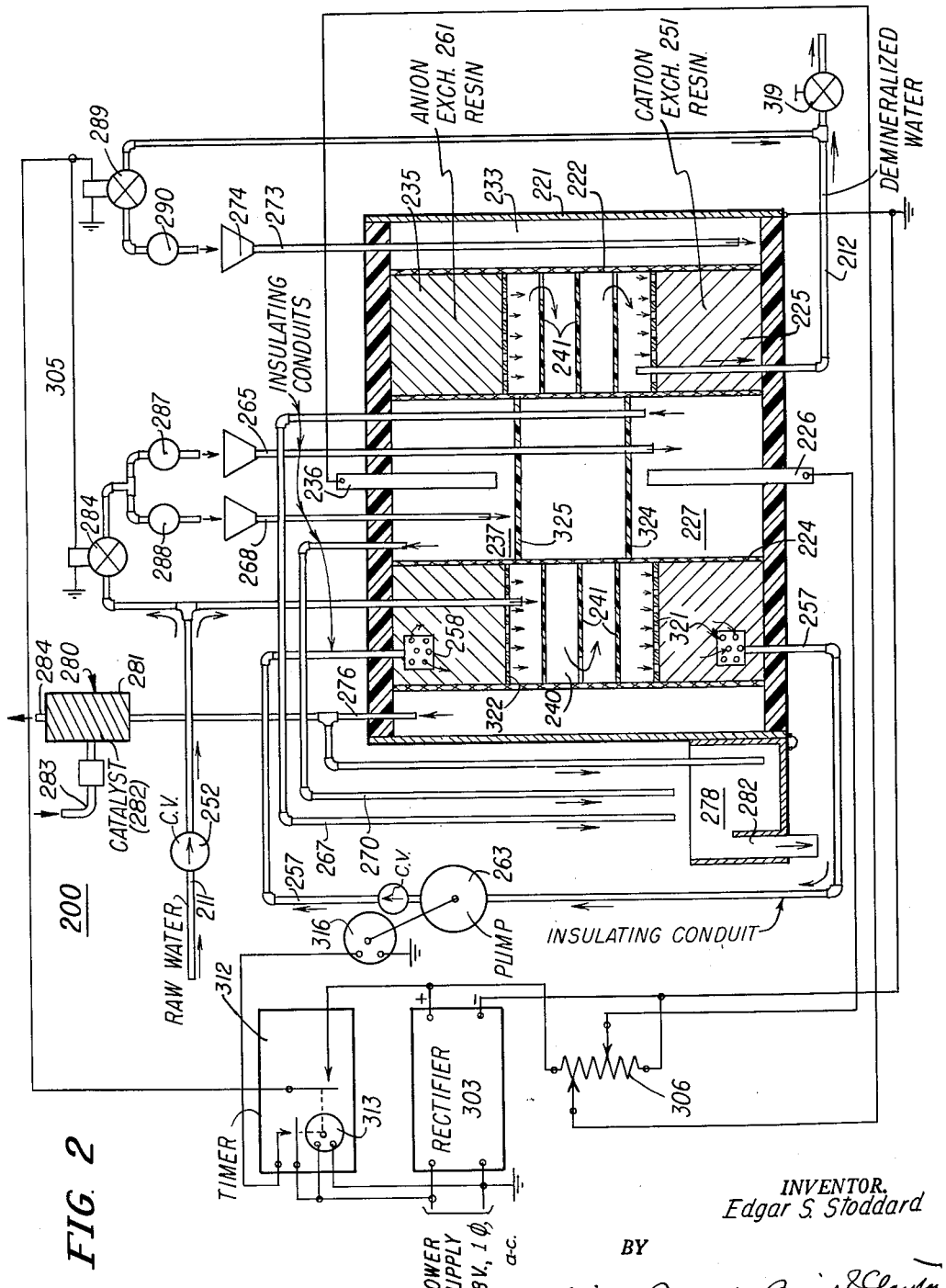
Fig. 2 is a diagrammatic illustration of a modified form of the water demineralizing system.

Referring now to Fig. 2, the modified form of the water demineralizing system 200 there illustrated is basically the same as that of the system 100 of Fig. 1, except that the cation exchange unit and the anion exchange unit are arranged in stacked relation within a single housing provided by a common cathode 221, and also utilizing common diaphragms 222 and 224. More particularly, in this arrangement, the diaphragm 222 is of substantially tubular form and disposed substantially concentrically within the tubular cathode 221 so as to define the common catholyte chamber 223 therebetween. The tubular diaphragm 224 is arranged substantially concentrically within the tubular diaphragm 222 and cooperates therewith to define a substantially annular space therebetween. Lower and upper substantially washer-like plates 321 and 322 formed of insulating material are arranged in the annular space between the diaphragms 222 and 224 and disposed in spaced-apart relation with respect to each other so as to define a lower treatment chamber 225 containing a cation exchange resin bed 251 and an upper treatment chamber 235 containing an anion exchange resin bed 261, as well as a buffer tank 240 therebetween. Lower and upper substantially disk-like insulating plates 324 and 325 formed of insulating material are arranged in the tubular space within the diaphragm 224 and disposed in spaced-apart relation with respect to each other so as to define a lower anolyte chamber also containing an anode 226 and an upper anolyte chamber 237 also containing an anode 236, as well as a void between the insulating plates 324 and 325.

The arrangement of the system of Fig. 2 is otherwise substantially identical to that of the system of Fig. 1, except that the pump 263 is disposed in the connection between the lower portion of the treatment chamber 225 and the upper portion of the treatment chamber 235. Also in the arrangement, the plates 321 and 322 have suitable perforations therein to accommodate the flow of the water undergoing treatment therethrough; and baffle structure 241 is arranged within the buffer tank 240 for the purpose of controlling the flow of the water undergoing treatment therethrough.

In this arrangement, the raw water is supplied via the raw water supply pipe 211 into the upper portion of the buffer chamber 240 and the demineralized water is supplied from the lower portion of the buffer chamber 240 into the demineralized water supply pipe 212. The operation of the pump 263 is effective to cause circulation of the water from the lower portion of the treatment chamber 225 to the exterior and thence into the upper portion of the treatment chamber 235; whereby the water passes through the anion exchange resin bed 261 and thence through the perforations in the plate 322 into the upper portion of the buffer tank 240. The water flows in a sinuous path through the buffer tank 240 as established by the baffles 241 and thence through the perforations in the plate 321 into the upper portion of the treatment chamber 225 and thence through the cation exchange resin bed 251, to complete the circuit back to the pump 263. The supply of anolyte to the respective anolyte chambers 227 and 237 is governed by the associated valve 284; while the supply of catholyte to the common catholyte chamber 223 is governed by the associated valve 289. The relatively low voltage D.-C. is supplied from the bridge 306 to the anode 226 that is operatively associated with the cation exchange resin bed 251 and the relatively high voltage D.-C. is supplied from the bridge 306 to the anode 236 that is operatively associated with the anion exchange resin bed 261.

The operation of the system 200 of Fig. 2 is substantially identical to that of the system 100 of Fig. 1, as previously described, and it will be understood that the regeneration of the cation exchange resin bed 251 is under the control of the voltage applied to the anode 226, while the regeneration of the ion exchange resin bed 261 is under the control of the voltage applied to the anode 236.

In this system, the conduits indicated by the reference numerals 257, 267, 270, 265 and 268, or at least appropriate sections thereof, are formed of insulating material in order to minimize stray electric currents therebetween by virtue of the fact that the anolyte in the anolyte chamber 227 is at a voltage with respect to ground potential that is essentially different and lower than that of the anolyte in the anolyte chamber 237.

Referring now to Fig. 4, there is illustrated schematically the water circulating arrangement incorporated in the system 200 of Fig. 2. In the arrangement: it will be observed that the pump 263 is located in the connection between the lower outlet of the cation exchange bed 251 and the upper inlet of the anion exchange bed 261; the raw water supply pipe 211 communicates with the upper inlet of the buffer tank 240, and the demineralized water supply pipe 212 communicates with the lower outlet of the buffer tank 240.

Recapitulating: in the systems of Figs. 1 and 2, the water to be demineralized is first introduced into a buffer tank containing previously demineralized water so that it is substantially diluted; and the resulting mixed water is circulated in a local loop circuit from the buffer tank through a cation exchange resin bed and then through an anion exchange resin bed and back to the buffer tank. The separate and distinct cation exchange resin bed and anion exchange resin bed are provided with separate and distinct power supply systems; and the voltage applied across the cation exchange resin bed is lower than that applied across the anion exchange resin bed so as to effect matching of the regeneration rates of the ion exchange resin beds with respect to each other; thereby to avoid both low pH water and high pH water in the demineralized water outlet of the system.

In view of the foregoing, it is apparent that there has been provided an improved water demineralizing method involving both an electro-cation-exchange unit and an electro-anion-exchange unit, wherein the recovery or regeneration rates of the two units are substantially matched, so that the states of charge or regeneration of the two units are always substantially matched in the operation of the system.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. The method of demineralizing raw water, comprising circulating water containing dissolved metal salts in a closed series loop circuit from a buffer tank through a porous cation exchange bed arranged in the treatment chamber of a first electrolytic cell and then through a porous anion exchange bed arranged in the treatment chamber of a second electrolytic cell and thence back to said buffer tank, wherein said two beds have substantially equivalent total ion exchange capacities, whereby the circulated water is demineralized by the removal therefrom of substantially equivalent cations and anions accompanied by substantially equivalent degenerations of the ion exchange capacities of said two beds, regenerating at substantially equivalent rates the ion exchange capacities of said two beds by the respective applications thereacross of independent direct voltages, whereby said two beds are maintained at substantially equivalent states of ion exchange regeneration in order to avoid both relatively low pH water and relatively high pH water in said buffer tank, introducing raw water into said loop circuit on the inlet side of said buffer tank, wherein said buffer tank has a volume sufficiently large to effect substantial dilution of the raw water introduced thereinto with the previously demineralized water therein, and withdrawing demineralized water from said loop circuit on the outlet side of said buffer tank.

2. The method set forth in claim 1, wherein said cation exchange bed essentially comprises a porous mass of synthetic organic polymeric cation exchange resin and said anion exchange bed essentially comprises a porous mass of synthetic organic polymeric anion exchange resin.

3. The method set forth in claim 1, wherein said cation exchange bed essentially comprises a porous mass of cation exchange resin and said anion exchange bed essentially comprises a porous mass of anion exchange resin, and said direct voltage applied across said cation exchange bed is lower than said direct voltage applied across said anion exchange bed.

4. The method of demineralizing raw water, comprising providing a first electrolytic cell including a treatment chamber containing a porous cation exchange bed and separated from respective catholyte and anolyte chambers by corresponding diaphragms, providing a second electrolytic cell including a treatment chamber containing a porous anion exchange bed and separated from respective catholyte and anolyte chambers by corresponding diaphragms, wherein each of said electrolytic cells also includes a cathode and a body of catholyte arranged in the catholyte chamber thereof and an anode and a body of anolyte arranged in the anolyte chamber thereof, circulating water containing dissolved metal salts in a closed series loop circuit from a buffer tank through said two beds in series relation and thence back to said buffer tank, wherein said two beds have substantially equivalent total ion exchange capacities, whereby the circulated water is demineralized by the removal therefrom of substantially equivalent cations and anions accompanied by substantially equivalent degenerations of the ion exchange capacities of said two beds, regenerating at a predetermiend rate the cation exchange capacity of said cation exchange bed by the application of a corresponding first direct voltage between the anode and the cathode of said first electrolytic cell, regenerating at substantially said predetermined rate the anion exchange capacity of said anion exchange bed by the application of a corresponding second direct voltage between the anode and the cathode of said second electrolytic cell, whereby said two beds are maintained at substantially equivalent states of ion exchange regeneration in order to avoid both relatively low pH water and relatively high pH water in said buffer tank, introducing raw water into said loop circuit on the inlet side of said buffer tank, wherein said buffer tank has a volume sufficiently large to effect substantial dilution of the raw water introduced thereinto with the previously demineralized water therein, and withdrawing demineralized water from said loop circuit on the outlet side of said buffer tank.

5. A water demineralizing system comprising a buffer tank, a first electrolytic cell including a treatment chamber containing a porous cation exchange bed and separated from respective catholyte and anolyte chambers by corresponding diaphragms and a cathode arranged in said catholyte chamber and an anode arranged in said anolyte chamber, a second electrolytic cell including a treatment chamber containing a porous anion exchange bed and separated from respective catholyte and anolyte chambers by corresponding diaphragms and a cathode arranged in said catholyte chamber and an anode arranged in said anolyte chamber, a buffer tank, conduit means completing a closed series loop circuit from said buffer tank to the treatment chamber of said first electrolytic cell and then to the treatment chamber of said second electrolytic cell and thence back to said buffer tank, pump means for effecting local circulation of water containing dissolved metal salts in said loop circuit from said buffer tank through said cation exchange bed in the treatment chamber of said first electrolytic cell and then through said anion exchange bed in the treatment chamber of said second electrolytic cell and thence back to said buffer tank, said two beds having substantially equivalent total ion exchange capacities, whereby the circulated water is demineralized by the removal therefrom of substantially equivalent cations and anions accompanied by substantially equivalent degenerations of the ion exchange capacities of said two beds, means for supplying catholyte into the catholyte chambers of said two electrolytic cells and for supplying anolyte into the anolyte chambers of said two electrolytic cells, means for applying a first direct voltage between the anode and the cathode of said first electrolytic cell in order to regenerate at a corresponding rate the cation exchange capacity of said cation exchange bed and for supplying a second direct voltage between the anode and the cathode of said second electrolytic cell in order to regenerate at a corresponding rate the anion exchange capacity of said anion exchange bed, said first and second direct voltages being so related that said two rates of regeneration of said two beds are substantially equivalent, whereby said two beds are maintained at substantially equivalent states of ion exchange regeneration in order to avoid both relatively low pH water and relatively high pH water in said buffer tank, an inlet pipe adapted to contain raw water under pressure and connected to said loop circuit on the inlet side of said buffer tank, an outlet pipe adapted to contain demineralized water under pressure and connected to said loop circuit on the outlet side of said buffer tank, and a valve arranged in said outlet pipe, whereby opening of said valve effects the supply of demineralized water from said buffer tank to said outlet pipe and effects the supply of raw water from said inlet pipe to said buffer tank, said buffer tank having a volume sufficiently large to effect substantial dilution of the raw water introduced thereinto with the previously demineralized water therein.

6. The water demineralizing system set forth in claim 5, wherein said voltage applying means is adjustable so that said first and second direct voltages may be selectively adjusted with respect to each other.

References Cited in the file of this patent

UNITED STATES PATENTS

| | | |
|---|---|---|
| 1,886,267 | Gleason | Nov. 1, 1932 |
| 2,093,770 | Billiter | Sept. 21, 1937 |
| 2,267,841 | Riley | Dec. 30, 1941 |
| 2,502,614 | Zender | June 17, 1944 |
| 2,763,607 | Staverman | Sept. 18, 1956 |
| 2,788,319 | Pearson | Apr. 7, 1957 |
| 2,812,300 | Pearson | Nov. 5, 1957 |
| 2,815,320 | Kollsman | Dec. 13, 1957 |

FOREIGN PATENTS

| | | |
|---|---|---|
| 733,234 | Great Britain | July 6, 1955 |
| 776,469 | Great Britain | June 5, 1957 |
| 675,253 | Great Britain | July 9, 1952 |

OTHER REFERENCES

Walters et al.: "Ind. & Eng. Chemistry," vol. 47, No. 1, pp. 61–66.